United States Patent
Johnson et al.

(10) Patent No.: US 11,868,811 B2
(45) Date of Patent: Jan. 9, 2024

(54) DETECTING REAL-TIME CLOCK LOSS

(71) Applicant: Amazon Technologies, Inc., Reno, NV (US)

(72) Inventors: Erik Jason Johnson, St. Helens, OR (US); Ryan Hegar, Happy Valley, OR (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 17/961,158

(22) Filed: Oct. 6, 2022

(65) Prior Publication Data

US 2023/0024441 A1 Jan. 26, 2023

Related U.S. Application Data

(63) Continuation of application No. 17/212,813, filed on Mar. 25, 2021, now Pat. No. 11,481,258.

(60) Provisional application No. 63/151,576, filed on Feb. 19, 2021.

(51) Int. Cl.
| | |
|---|---|
| *G06F 9/50* | (2006.01) |
| *G06F 9/48* | (2006.01) |
| *G06F 1/14* | (2006.01) |
| *G06F 9/455* | (2018.01) |

(52) U.S. Cl.
CPC ............. *G06F 9/5038* (2013.01); *G06F 1/14* (2013.01); *G06F 9/45558* (2013.01); *G06F 9/4881* (2013.01); *G06F 2009/45591* (2013.01)

(58) Field of Classification Search
CPC .................................................... G06F 9/5038
See application file for complete search history.

(56) References Cited

U.S. PATENT DOCUMENTS

2004/0236746 A1 11/2004 Lomet et al.

OTHER PUBLICATIONS

Notice of Allowance dated Jun. 23, 2022 issued in U.S. Appl. No. 17/212,813.

*Primary Examiner* — Jacob Petranek
(74) *Attorney, Agent, or Firm* — Hogan Lovells US LLP

(57) ABSTRACT

An application (or process) may have an amount of steady state work to perform per unit time, as well as one or more mechanisms for doing a lower quality job of that work in the event the application falls behind. Approaches presented herein can utilize a clock monitor that enables the application to determine whether a clock loss was encountered that was due to an external source, and is of an amount of time that may be naturally recoverable by the application. If so, the application can enter into a mode of operation wherein the activation of one or more recovery mechanisms is postponed for a period of time to provide the application time to recover. If, after the period of such mode operation, the application has not recovered from the real time clock loss, then the recovery mechanism(s) can be activated as appropriate.

20 Claims, 7 Drawing Sheets

DETECTING REAL-TIME CLOCK LOSS

CROSS-REFERENCE TO RELATED APPLICATIONS

This application claims priority to pending U.S. application Ser. No. 17/212,813 filed May 25, 2021, entitled "Detecting Real-Time Clock Loss", and U.S. Provisional Patent Application Ser. No. 63/151,576, filed Feb. 19, 2021, and entitled "Detecting Real-Time Clock Loss," which are hereby incorporated herein in their entirety and for all purposes.

BACKGROUND

Various computer-based applications and services are time sensitive, where there is a need or desire for these applications and services to execute in real time with little to no loss of time or delay in execution. While there may be issues with these applications and services that occasionally result in delays, there may also be delays are due to other hardware or software systems or components, which may be independent of these time-sensitive applications or services. In many of these situations it would be helpful for the time-critical application or service to be able to identify such an occurrence or delay, but the software or service may be paused or otherwise unable to execute during that delay, and thus may be unaware of such an occurrence, or at least the cause or duration of such an occurrence, which can generate difficulties in recovering from the occurrence, at least without a loss or degradation in output.

BRIEF DESCRIPTION OF THE DRAWINGS

Various embodiments in accordance with the present disclosure will be described with reference to the drawings, in which.

DETAILED DESCRIPTION

Figure 1:
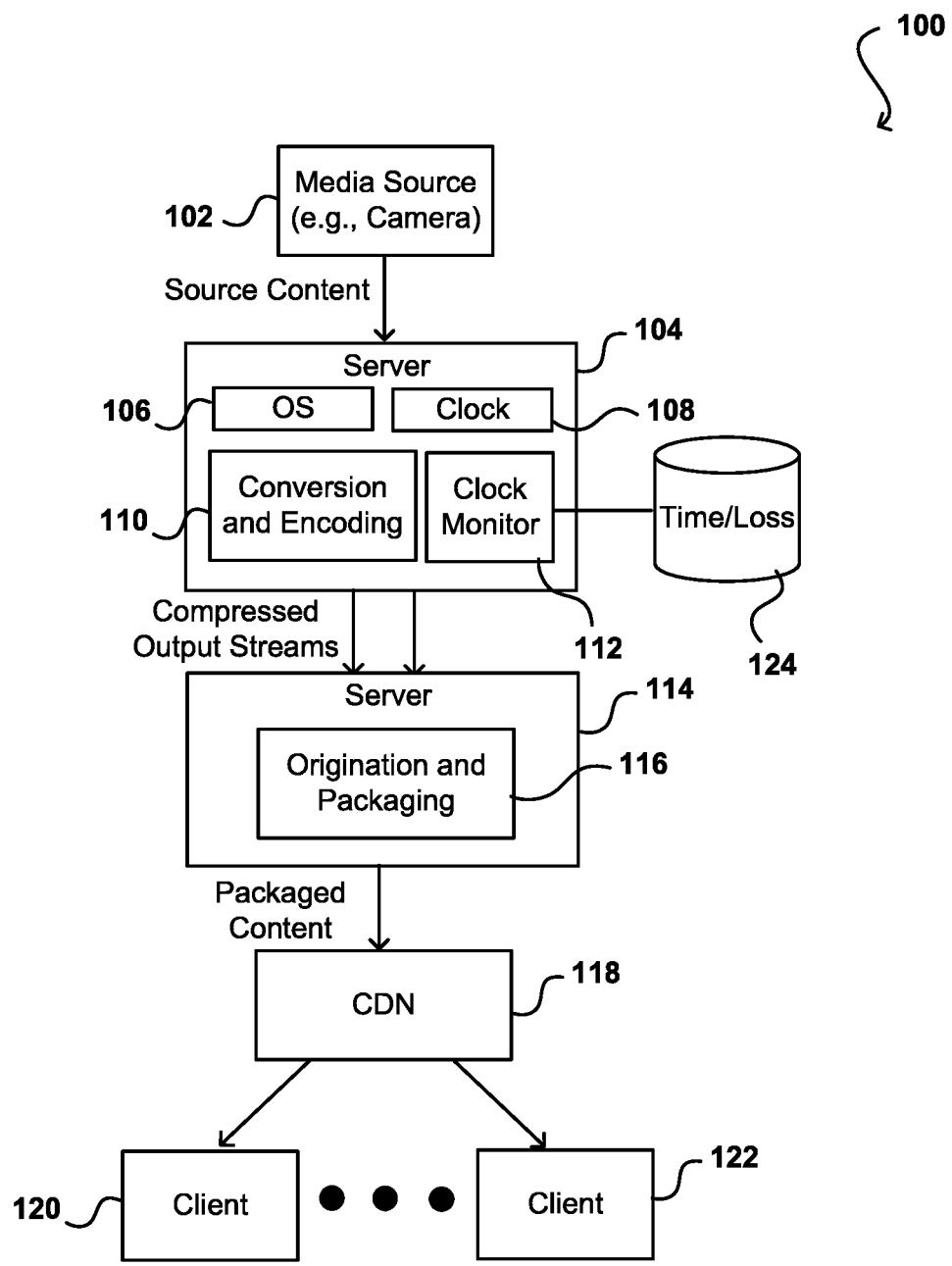
FIG. 1 illustrates an example system for processing media in real time that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the determination and management of time loss in an electronic environment. In particular, various approaches provide for the monitoring of a reference clock to determine when a perceived loss of time occurs, at least with respect to that reference clock, as well as to identify a source of that loss. Such loss can be referred to as a "clock loss," as it is a perceived loss of time with respect to a reference clock, which may or may not correspond to an actual "loss" of time, such as a period of time where an application or process was paused and unable to execute instructions or process any data. In at least one embodiment, a real time clock monitor can take the form of a process or thread, for example, that can make periodic calls for current time values to a reference clock source, such as a system clock of a server or an internal clock of a central processing device (CPU). Upon receiving a current time value from that reference clock source, the clock monitor (or an application accessing that clock monitor) can compare the reported current time value against an expected time value, or a time value maintained by the clock monitor (or an application or source in communication with the clock monitor) that the clock monitor expects to be current. If the reported time value from the reference clock source does not match the expected time value of the clock monitor or application, at least within an acceptable variation amount (as may be due to noise or timing variations inherent to the system), then a determination can be made that some amount of clock loss was experienced. If the application determines that there was an unacceptable amount of clock loss, which was also experienced by the clock monitor, then the application can determine that the clock loss was due to a source external to the application, such as underlying hardware or operating system software. In a virtualized environment, this delay may have resulted from an operation performed in an underlying virtualization layer. If the application determines that it lost time (e.g., that an expected time value does not match the reported current time value) but the clock monitor did not detect a similar time loss, then the application can determine that the loss of time was likely due to an issue with the application itself.

An ability to determine a clock loss, as well as a source of that clock loss, can enable an application to determine one or more actions to take, or not take, based at least in part upon a determined source of the clock loss. If the source was external to the application, the application may switch to operating in a loss management mode, such as a relaxed mode or similar mode of operation, for a period of time. In a relaxed mode of operation, for example, the application will not initiate one or more recovery actions to attempt to recover from the time loss, but instead will allow the application a chance to catch up naturally using, for example, its standard operating processes. If the application has not recovered from the clock loss after the period for relaxed mode operation expires, the application can perform or execute one or more recovery actions, such as to drop some of the data, process only a portion of the data, or perform reduced processing of that data, among other such options. In other embodiments, other loss management modes might be activated, such as may include a hyper mode where additional resources are allocated to attempt to catch up without loss or degradation in output. An ability to determine a source of clock loss can prevent an application from taking such recovery actions if not warranted, which can prevent the application from unnecessarily reducing a quality of output or utilizing additional resource capacity.

Various other such functions can be used as well within the scope of the various embodiments as would be apparent to one of ordinary skill in the art in light of the teachings and suggestions contained herein.

FIG. 1 illustrates an example environment 100 in which aspects of the various embodiments can be implemented. In this example, media content (e.g., live audio and video) is captured, generated, or otherwise obtained by a media source 102, such as a video camera, which can transmit at least a portion of that content to a server 104 for processing. The content may be sent through an appropriate channel, such as across one or more wireless or broadcast networks, to be received to an appropriate address or destination, such as a network address or application programming interface (API), among other such options. In some embodiments, the server 104 may be selected from a number of servers, or other pool of electronic resources, capable of processing at least that type of content. There may also be multiple servers or computing resources that process different portions of that content, or perform different types of processing on that content.

In this example, the content is to be processed and delivered, or at least made available, to various client devices 120, 122 or other such recipients. These client devices may be of the same or different types, and may have similar or different capabilities, such as different display resolutions or aspect ratios or support for different content formats. Such devices may include, for example, smartphones, tablet computers, desktop computers, notebook computers, televisions, set-top boxes, streaming media devices, wearable computers, virtual reality (VR) or augmented reality (AR) devices, and the like. In at least one embodiment, appropriate versions or formats of this content can be delivered to these client devices 120, 122 via a content delivery network (CDN) 118 or other content delivery system or service, as may include CloudFront from Amazon.com, Inc. In at least one embodiment, a content management and delivery service such as Elemental from Amazon Web Services, Inc., may utilize various servers to perform various content-related tasks on source content that is to be distributed to these client devices. In at least one embodiment, this can include at least a first server 104 with software 110 to perform tasks such as media format conversion and encoding, or transcoding, and a second server 114 with software 116 to perform tasks such as content origination and packaging. It should be understood that a resource provider such as Amazon Web Services (AWS) may provide multiple servers, or portions of multiple servers, that can provide instances of such functionality for processing different content streams. The content-processing applications 110, 116 on each of these servers 104, 114 may need, or at least be intended, to operate in real time, or at least near real time, for at least some types of content in order to deliver an intended experience to consumers of that content, who may access that content through one or more of the client devices 120, 122. This may include, for example, the broadcasting of live events, such as sporting events or game tournaments. Any delays, reduced video quality, or dropped frames may result in an undesirable experience for consumers of this content. Further, dropped frames during the presentation of content such as advertising may be undesirable for content providers such as advertisers, who may have paid for a certain amount of content delivery. There may be other undesirable impacts of such delays or occurrences as discussed and suggested elsewhere herein.

In at least one embodiment, an application 110 (such as MediaLive from Amazon Web Services, Inc.) may utilize a system clock 108, or other reference clock source, to ensure real-time performance, as well as to detect potential delays or periods of inactivity. This clock may be an internal hardware clock of the server 104, or a processor of that server, or may be provided via an operating system (OS) 106 executing on that server, among other such options. In some embodiments, the application may make calls into the OS 106, such as Linux, to request or determine the current time. There might be situations, however, where the underlying OS 106 may pause the conversion and encoding application 110, or other application(s) executing on top of that OS. This might be the case when, for example, the OS has to apply a patch or update. During that period, any software executing on top of that OS may be paused for a period of time, such as on the order of seconds or milliseconds in some example situations. During that time, the application 110 may be unable to execute, and may also be unable to determine that there has been a pause until such time as the application is able to resume execution, requests the current time from the OS, and determines that there was a "loss" in clock time because the time reported by the OS does not match the time expected by the application 110, at least within an acceptable variation amount. Since the application is unable to determine the cause for the loss of time in many instances, the application can perform various conventional recovery tasks to attempt to make up for that loss of time. For media content, this may include dropping one or more frames or increasing a processing or transmission speed for a period of time, among other such options. If the loss of time was due to a short pausing by the underlying OS, or a similar occurrence, it may not be necessary for the application to take such a remedial action, as the time loss may be able to be recovered from during the course of normal execution in many situations. Without the ability to determine such a reason for the loss, however, the application may perform these remedial or recovery actions unnecessarily, which in the case of dropped frames, reduced processing, or other such actions may result in an undesirable modification of the content to be transmitted or presented.

Accordingly, approaches in accordance with various embodiments can utilize a component such as a clock monitor 112 to identify delays or pauses that may impact one or more applications, such as a conversion and encoding application 110, which may include more than one application or process in at least some embodiments. In at least one embodiment, such a real time clock monitor 112 can take the form of, or utilize, at least one process, module, thread, or application that executes outside, and independent of, the application 110, while in some embodiments a clock monitor 112 may be part of, or at least associated with, the application. A real time clock monitor 112 in this example can make calls into an OS 106, or to a system clock 108 or reference clock source, for example, to obtain the "current" time value, at least from the system, server, or reference clock perspective. This may include, for example, making a sequence or series of API calls into the OS 106, with each call asking for the current time. These requests can be sent at regular intervals in at least some embodiments. In at least one embodiment, after the OS 106 responds to the real time clock monitor 112 with the current time value as determined from the reference clock 108, the clock monitor 112 can store, provide, or otherwise make that current time value available to the application 110, and can send another API request to the OS to request that the clock monitor (e.g., application, thread, or process) be put to sleep or otherwise paused from execution for a period of time. This period of time can be approximately the amount of time between current time requests, while accounting for some latency in sending and receiving requests to, and from, the OS. For example, it might be desirable to request the current time every 10 milliseconds or 20 milliseconds, and for those situations the clock monitor might request that the OS put the clock monitor application to sleep for approximately 10 or 20 milliseconds (or slightly less to account for the actual request and response transmissions). Such an approach can essentially place the OS in charge of the timing of the clock requests from the clock monitor 112. Such an approach can enable the clock monitor 112 to determine when there has been a loss in time, or delay, due to the OS or server hardware, for example, or another factor outside the application itself. This information can help the application to determine an appropriate action to take in response to the time loss. In at least one embodiment, information about reported time or detected time loss can be written to an event log 124 or other such repository for subsequent analysis. In some embodiments an application could query this database for loss information instead of contacting the clock monitor 112. In some embodiments, a system debugger or other such system might query the log in the event of a bug report, for example, as discussed in more detail elsewhere herein. By being able to determine that a glitch in output was due to pausing of an application by an underlying system component, for example, a debugging team can save time, effort, and resources by avoiding the need to debug the application to attempt to determine whether the application caused the glitch, as well as to attempt to determine the cause and repair mechanism for such a glitch. Such information can also be sent to a metrics monitoring service, or other such system or mechanism, that can attempt to monitor the system for delays or time loss events, which can then be reported to the appropriate person or used to generate a performance report, among other such options.

Figure 2A:
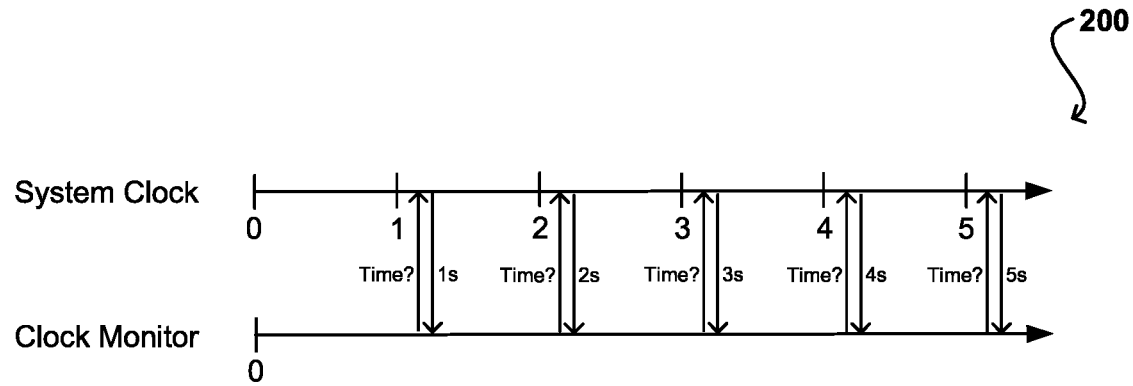
FIGS. 2A and 2B illustrate example timelines that can be compared in accordance with various embodiments.

As an example, FIG. 2A illustrates a set of timelines 200 for operation of an application on a computing resource under typical conditions. The timelines are shown in monotonically increasing seconds starting from zero, but it should be understood that these can represent any appropriate timestamps or time values, as may be based on a 24 hour clock or other such mechanism. In the timelines 200 of FIG. 2A, the top timeline represents what will be referred to herein as "accurate" or "current" time, at least from the perspective of a reference clock of a computing system or resource. This current time may be maintained by a system clock in a central processing unit (CPU) or other clock mechanism of the respective computing resource. The timeline on the bottom represents time as understood by the application, in this example based upon information reported by a clock monitor. As illustrated, the clock monitor can submit regular requests to the system clock for the current time, and can receive back responses indicating the current time. If there are no delays or unanticipated issues, the time current time reported by the system clock will match the time expected by the application. As discussed elsewhere herein, there may typically be some slight jitter or variation in these time numbers due to slight latency and variation in the system, but the time values should agree to within an allowable jitter or variance value or range, or other acceptable variation amount, such as +/−1 ms, among other such options that can vary by system, configuration, or implementation. As long as there are no delays, the requests for current time should be sent regularly, and the received current time values should match the expected time values.

Figure 2B:
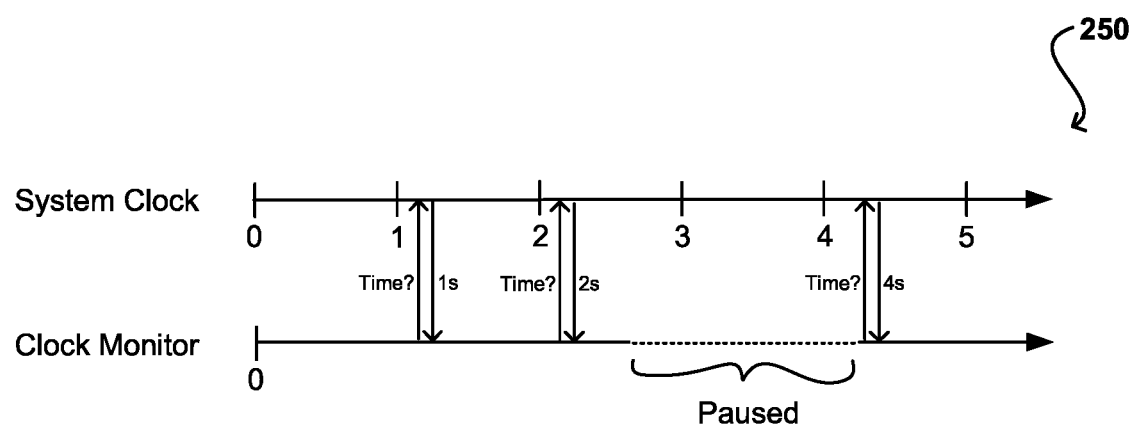

There may be situations, however, where these time values may not agree, or will otherwise differ by more than an amount of allowable jitter or variance. This difference may be due to a problem with the application itself, or may be due to an external source or cause. FIG. 2B illustrates timelines 250 for one such situation. In this example, a computing resource may pause one or more applications executing on that computing resource, such as to apply a patch or update to the operating system or virtualization software on which these applications may sit, among other such options. As illustrated, this pausing of the applications may result in those applications not being able to obtain one or more current time values from the reference clock source. When the application or clock monitor is unpaused, or allowed to resume execution, the next current time value received from the reference clock may not match the value expected by the application, as the application missed at least one time update while paused. Such information can be valuable, however, as a determination can be made that the lost time was due to an external source and likely not anything caused by the application itself. This information can help to determine any actions for the application to take to make up for the "lost" time. As mentioned, for small impulses or delays the application may be able to catch up through normal operation and without taking any special actions that might otherwise be taken, but that might impact a quality of output of the application.

In at least one embodiment, if it is determined that there was a relatively short loss of time (e.g., less than two seconds in some embodiments) then the application may determine to switch to a different mode of operation. One such mode of operation may be referred to as a "relaxed" mode of operation. In a relaxed mode, a time-sensitive application or process will delay active recovery, or otherwise not take special action to attempt to recover from the loss of time. This can include delaying the activation or execution of one or more recovery actions for a period of time. This relaxed mode of operation may be for a set period of time, such as ten seconds, or a flexible period of time, as may depend upon such factors as the amount of data buffered, the current frame rate for content delivery, the current load on the system, and so on. In many situations, where there was a brief pause of the application, the system or application may catch up while in the relaxed mode of operation with no specific recovery action being taken, such as to drop frames or modify a speed of delivery for video content. If the relaxed mode is set for a specific or maximum period of time, or there is another criterion for the application to exit relaxed mode, and it is determined that the application has not caught up while executing in relaxed mode, then one or more recovery actions can be taken to catch up, such as to drop frames, change processing speed, or alter an amount of the content being processed, among other such options. In this way, these remedial or recovery actions are only taken for specific types of time delay events when the application is not able to catch itself up within a specified or maximum period of time. In other modes of operation, such as a hyper mode of operation, additional resources or capacity may be allocated to attempt to catch up and recover from the time loss, without the need to reduce the amount or quality of processing being performed on specific data or over a period of time. This can include, for example, allocating one or more processors, processor cores, or servers for a time-sensitive task, at least until there has been sufficient recovery from the time loss.

Such an approach can be beneficial to real time applications or services, such as MediaLive which is highly dependent upon real-time execution of the underlying software in order to reliably ingest video content, transcode that content, and transmit that content to various destinations or recipients with low latency and jitter. There can be various other applications and services that depend upon real-time execution of software to the degree that a relatively short stall, such as may be on the order to two seconds or less, may have a meaningful impact. This can include applications executing on shared resources, where a short stall simultaneously across all cores of a guest OS could also have meaningful impact. Such an application or service can benefit from a metric that monitors thread execution to help detect stalls and correlate those stalls with other system or service events. In another example, a service that depends upon real time execution of software to the degree that a 50-120 millisecond stall on an individual core of a guest OS could have meaningful impact may also benefit from disabling tasks such as console logging or reducing the messages sent to the console.

In at least some embodiments, a clock monitor 112 can be used to detect clock loss in a real-time application that is executing in a virtualized environment that does not involve cooperation or coordination with a guest operating system ("guest OS"), virtualization component (e.g., hypervisor), or hardware platform. While this application may sit on top of a guest OS and hypervisor as part of a virtual machine provided by a server or other computing resource, for example, such an approach can work independent of these virtualization mechanisms to provide an indication of lost time, as well as a measure of the actual amount of lost time. Such an approach can also indicate the processor(s), or processor core(s), on which the lost time occurred. A clock monitor 112 can make this information available to one or more real time applications, which can make one or more adjustments in response to the lost time, such as to enter a relaxed mode or take a recovery action. Some applications may instead store or report on the time loss, which can help with future or potential debugging or process monitoring.

In at least one embodiment, one or more high priority real time threads can be created, such as through use of a corresponding prioritization policy. These threads may be created per processor or processor core, in which each thread may have affinity to a different core. Each thread can check the current clock time independently, sleep for a determined duration, such as 20 milliseconds, and check the clock time again when regaining execution, or awaking from a sleep state. If a given thread can determine that it has slept significantly longer than expected, such as 50 milliseconds in one example, then that can be reported as a metric of time loss. The threshold for which a time loss is reported can vary by application, implementation, or operational state, among other such options, and may include a determined percentage, fraction, or other portion or multiple of the sleep duration. The time metric can then be checked for correlation when an unexpected event occurs, such as the loss of one or more packets of data, or a software timeout.

In at least one embodiment, these high priority real time threads can be given a higher priority than all but the most critical services in the guest operating system, and higher priority than any threads in the real time system being monitored. For example, in a Linux OS-based environment, thread priorities between 51 and 98 can be appropriate, depending at least in part upon the real time application(s) running on the machine. In order to monitor per-processor (or per-processor core) time loss, one such thread can be started on each processor using the core affinity mechanisms provided by the guest OS. Individual threads can repeatedly read the system clock, sleep for a short period of time, and then read the system clock again. A thread can then compute the time between when the system clock was first read to when the clock was read a second time, and can compare this difference against the requested sleep time. If the actual sleep time was longer than the requested sleep time, a determination can be made that the thread lost time. In at least one embodiment, the actual amount of lost time can be bounded by the actual sleep time minus the request sleep time at a minimum, and the actual sleep time at a maximum.

In order to avoid issues with clock reporting, a clock used to measure time should be monotonically increasing in at least some embodiments. Further, this clock should not be modifiable by users, user applications, time protocols, or other unauthorized sources that could potentially adjust or impact operation of the clock. As an example, in a Linux environment CLOCK_MONOTONIC may present a suitable clock source. It should be noted, however, that the scheduling of these threads will not be perfect and, as such, some amount of jitter can be expected in the sleep time detected by these threads. Approaches in accordance with at least one embodiment can handle such jitter, at least in part, by adjusting the requested amount of sleep time, as well as an amount by which the actual sleep time must differ from the requested sleep time before reporting lost time. It at least one embodiment, this can include reporting two times: a requested sleep time, and a lost sleep report time. For example, a requested sleep time may be 50 ms, with a requested lost sleep report time of an additional 20 ms, or 70 ms in total. Thus, any jitter in the 50 ms requested sleep time that is less than 20 ms will not result in a report of lost time. In at least one embodiment, then, the lost sleep report time should be sufficient to prevent lost sleep reporting due to normal jitter or timing variation. The time period for lost sleep reporting may also be determined through any of a number of mechanisms, such as routine experimentation, process optimization, or machine learning, to avoid reporting on time loss that is sufficiently short or small such that the application has at least a minimum probability of recovering without taking remedial action or impacting an end user or recipient experience more than an acceptable amount. Longer requested sleep times can thus help to smooth out scheduling jitter, as will allowing larger differences in the actual sleep time versus the requested sleep time.

Although mentioned with respect to real time media processing, where it is often desirable to process and transmit media content at essentially the same rate at which that content is received, there may be various other real time applications that can benefit from aspects of the various embodiments as well. For example, there can be robotic control applications where unintended delays or loss of instructions can result in incorrect performance of one or more tasks. For vehicle control systems, the analysis of all data in real time can be critical to avoiding collisions or other unintended actions. In online gaming, a loss of game video frames or slight pause in gameplay can be the difference between victory and defeat in some instances. There may be other applications where real time processing and performance may not be critical, but can at least result in a less positive experience for users, such as for video conferencing hardware where drops in video frames or pauses in the audio or video content can be frustrating for users, and may cause those users to research or utilize other conferencing options. For any of these or other such applications, services, functions, or tasks, it can be desirable to identify time loss when it occurs, and intelligently determine how and whether to compensate for that time loss. As mentioned, this determination can also include a source of the time loss, such as whether the time loss was the result of a time-critical application or a result of the hardware and/or software on which that application is running, among other such options.

As mentioned, determining a source of potential time loss can be important in at least some embodiments for determining one or more appropriate actions to take in response to that time loss. For example, if a time-critical application has a bug that has caused it to lose time, then the application may need to engage one or more remediation or recovery mechanisms to attempt to recover from that loss of time. If, however, the time loss was due to an external source, such as a network server on which the application is running, then the application may not need to take any action to recover. For example, the operating system on a network server might pause an application for a short period of time to perform a task, such as to apply a patch or upgrade to the operating system, virtualization software, or other system software. This could result in the server providing a time value to the application that is different than expected, since the application did not update its understanding of time while it was paused because the application was unable to execute any functionality during that time. This unexpected time difference could cause the application to determine that it is suddenly behind, or has lost time, and could attempt to engage one or more recovery mechanisms to try to catch up to what it thinks is the correct time. The action that an application will or should take in the event of time loss can vary based on whether the application or a source external to the application caused, or resulted in, the time loss, as those may correspond to two fundamentally different problems in at least some situations.

In some embodiments, it may be possible for an external system, service, or component to indicate that an amount of clock time is likely to be lost at, or around, a specified time in the future, such as when a patch is to be applied to a hypervisor on which an application is running. An application can then anticipate the delay, and can understand the cause of the delay when that delay occurs. An application may be able to take certain actions in anticipation of a delay, such as to get ahead in processing of data so that there is no impact on delivery of content or other output. Knowing that the delay is from an outside source can also help the application to take an appropriate action, which in some embodiments may include not taking any special remedial or recovery actions. In many systems, however, it will not be possible, or at least practical, or receive advance notice of every potential time loss, such that a clock loss mechanism as presented herein can still provide value, and at worst can provide a backup mechanism for advance notice of time loss.

In at least some embodiments, an amount of time lost can be used to determine an appropriate action to be taken. As mentioned, an amount of time lost can be calculated any time updated clock information is received. If the amount of time lost is within an acceptable loss or variation range or threshold then no action may need to be taken. If the amount of time lost is outside a range of acceptable time loss, but not at a critical amount, then a first type of action may be taken to attempt to recover, such as to increase a speed of processing, increase a size of a data buffer, perform less processing per data instance, or process only a subset of those data instances, such as a portion of each video frame for a period of time. If the loss is greater than a critical amount of loss, however, other more drastic actions may be taken, such as to drop a number of frames in order to enable the application to quickly catch up to the current time. The number of frames to drop can be determined based at least in part upon the amount of time lost. Certain applications may require notice or consent before taking such an action, such as where an impact of such a drastic action may be critical if unexpected. In at least some embodiments, at least some of these values may be configurable by a user or application, such as threshold values at which to take certain actions, as well as the actions to take when meeting or exceeding those thresholds. In at least some embodiments, these values may be selected or optimized based at least in part upon the sensitivity of the application to time delays of different lengths. In at least some embodiments, the polling of clock time should occur with a higher frequency than the granularity or sensitivity of the application, such that if a system can tolerate up to 50 ms of delay then polling should be more often than every 50 ms.

In at least one embodiment, a clock monitor can operate by making API calls through the operating system, such as Linux, which enables polling of the current time maintained by a system clock. This system clock can be any relevant clock or time maintenance mechanism, such as a timestamp of a CPU clock or an interrupt on such a clock, among other such options. The clock monitor can make regular calls to read the time, at a determined frequency. After receiving the current time, the clock monitor can then make another API call to the OS to ask that the clock monitor be put in a sleep state, or otherwise have execution paused, for a determined period of time. In other embodiments, the application may be able to pause its own execution or otherwise wait for a determined amount of time. When a call is made to pause a clock monitor, such as for a specific thread, execution of that thread will be paused for approximately the specified amount of time, allowing for some jitter due to scheduling and execution variance. The OS in at least one embodiment can then move the process or thread from something that it schedules and attempts to execute into a holding queue where no execution will be performed. Once the specified amount of sleep time has passed, the OS can move that thread or monitor task from the queue back onto the list or schedule of tasks to be performed or instructions to be executed. This process can continue in order to provide clock monitoring functionality as discussed herein. For each reported time, a time difference can be calculated, and the thread or monitor can be paused or put to sleep until the next time for reading the clock and reporting. The calculation of time difference, or loss, can be performed by the application, the clock monitor, or another such component or process.

As mentioned, in various embodiments at least some of this functionality can be thread-based, process-based, or task-based, among other such options. In at least one embodiment, there may be a single process that utilizes multiple threads of execution. For example, a process might launch one thread per CPU or hardware core. The application may want to be able to detect when there is a delay in any of these individual cores. Some pausing will be applied across all cores simultaneously, while other pausing may only occur on a specific subset of cores, or even individual cores. The clock can then be read using an API call, or similar request mechanism, for each individual or relevant thread. The OS can then put the relevant threads to sleep until the next time for reading the clock. In at least some embodiments, the priority of those threads can be set as high or higher than any other thread as discussed elsewhere herein, in order to minimize scheduling delays or other timing-related jitter. Indicating to Linux that a thread is more important than any other threads, for example, can ensure that Linux will try to execute that thread first when the time arises. In some embodiments, each thread will poll the time at a similar frequency with similar tolerance for time loss, while in other embodiments different threads may have different timing values for different processors or cores. The amount of jitter permitted may be a factor of the number of other high priority threads or processes that are running, to allow a reasonable amount of time for the thread to be resumed. The allowable jitter may be determined based upon various other factors as well, such as the accuracy or granularity of the relevant clock. In many systems there will also be some limit to how quickly an OS such as Linux can schedule threads, which may be on the order of at least a few milliseconds in some embodiments. The amount of acceptable jitter can also depend upon the length of the sleep period or frequency of polling, as smaller sleep periods may benefit from higher percentages or fractions of time allowed for jitter than longer sleep periods. In some embodiments a determination can be made to determine a noise floor in the system, and the tolerance can be set at least above that noise floor. There may be no hard upper limit on jitter tolerance, but this tolerance will usually be set based upon a desired level or range of performance. In one example, a noise limit might be +/−10 ms, and the application may not care about clock loss of 5 ms or less, such that the tolerance may be set to 15-20 ms because less than that may not be worth taking action.

In at least some embodiments, an amount of clock loss that has been determined to have occurred can be recorded by the clock monitor. Information about the loss can be made available to any application, service, or function that might depend upon real time operation, or may otherwise be sensitive to clock loss. In this example, an application may submit a request to the clock monitor to ask whether the monitor has detected a time loss. In other embodiments, the clock monitor may push data to that application whenever an unacceptable time loss is determined. In some embodiments, a clock monitor may provide information about an amount of time that was determined to have been lost, while in other embodiments the clock monitor may just provide information indicating that time was lost at, or around, a specific point in time. In some embodiments the data may include two values or ranges, such as an approximate amount of time lost and an interval in time during which that time was lost. The application may also make requests with such values, submitting a request asking, for example, whether the clock monitor lost more than 200 ms of real time in the last five seconds. The clock monitor can then respond with a simple "yes" or "no," or other such confirmation. In some embodiments, a clock monitor may be able to respond that it has not only seen clock loss, but that it is still experiencing clock loss, such that the clock monitor may be able to provide confirmation even before a respective core is allowed or able to continue execution.

As mentioned, there may be various actions taken in the case of clock loss. In one example, a component may be processing live video and attempting to output the processed video at the same rate in which the live video input is received. If the system is not losing time, but frames are being received faster than they can be processed and output, such that the frames are backing up, the application can attempt to first increase a speed of processing, and if that does not work and the buffer is getting to a maximum fill state then the application can begin dropping frames, or determining not to process at least some of the received frames, to attempt to catch up. Other actions can be taken as well, such as to process only a portion of each frame, skip an input, skip ahead in the stream, and so on. These may include any of a number of actions that an application might take to attempt to catch up if it is falling behind in processing. If the application is able to determine that there was real time clock loss, however, and that the application is not necessarily that far behind, then the application can be more tolerant of those types of backups, at least for a period of time or amount of backup. The application in such an instance can determine that the application was not the cause of the delay, or inability to process input received at a higher rate, but just that the application lost time. Accordingly, the application can be more tolerant of this type of time loss, instead of taking actions such as dropping frames as if the application is behind. The application can continue to process frames as normal, as if no time loss had occurred, and can allow the system an opportunity to catch itself up through its normal mechanisms. This can be referred to as entering a relaxed mode of operation, as discussed elsewhere herein. While in relaxed mode, the application will not take special action to attempt to recover from the time loss, but will operate as normal to give the system a chance to catch up normally. The application may not like the fact that it is behind in real time, but it has determined that it will not overreact and make the problem worse by taking action such as to start dropping frames.

Without such a mechanism in place, a time-sensitive application or service may be unable to determine whether the problem is a steady state performance problem. Thus, the application or service would have to take actions to attempt to make up for the fact that the application is falling behind. The use of a real time clock monitor can help to determine when the problem is not a steady state problem, that the loss of time was the result of an impulse that was out of the control of the application or service, such that the application or service can allow the system to attempt to catch up on its own in real time. Such a system may be able to run slightly faster than real time, so as long as the application or service does not overreact to the problem then the system should be able to catch up quickly. Without such a mechanism, the application or service would determine that it is falling behind in real time and would take one or more recovery actions that may not be needed to catch up, which may result in a poor user experience or performance.

In at least one embodiment, an application or service can enter a relaxed mode, or similar mode, or operation for a fixed or determined period or length of time. In other embodiments, there may be intelligence in the system to determine when to exit relaxed mode, such as when the system has caught up or when the problem has gotten to a point where another more aggressive action should be taken. For a fixed period of time, such as ten seconds, an application or service can determine whether the issue persists after exiting the relaxed mode, as which time the otherwise normal recovery actions or mechanisms can kick in, such as to being dropping frames or reducing an amount of processing, etc. If the system caught up while in relaxed mode, the system can continue to operate as if there was no loss of time or other such action that would have impacted performance. In some embodiments, relaxed mode may not come with a fixed time period but an application may instead stay in relaxed mode until the system catches up or until the issue gets to the point where another recovery action should be taken. Different actions may be taken as well based on factors such as the amount of delay or tolerance for delay, where those actions may include adjusting a buffer size or switching a compute resource used to process the data.

As mentioned, in some embodiments the detection of an impulse or delay due to an external source may not result in a specific additional action being taken, but information about the detection can be stored to an error log or other such location or repository. In such an implementation, an operator may determine that they do not want to adjust the operation of the system, but want to store this information to help with debugging, testing, or performance analysis. If a user reports a glitch in a video stream at a certain time, for example, the operator can check the error log to determine whether there was an impulse or external delay at, or proximate, that time, and if so can determine that the glitch was not due to the video processing software but was due to an external cause, such that no debugging or further analysis may be warranted, which can save time, cost, and compute resources by avoiding the unnecessary problem tracing or debugging.

Figure 3:
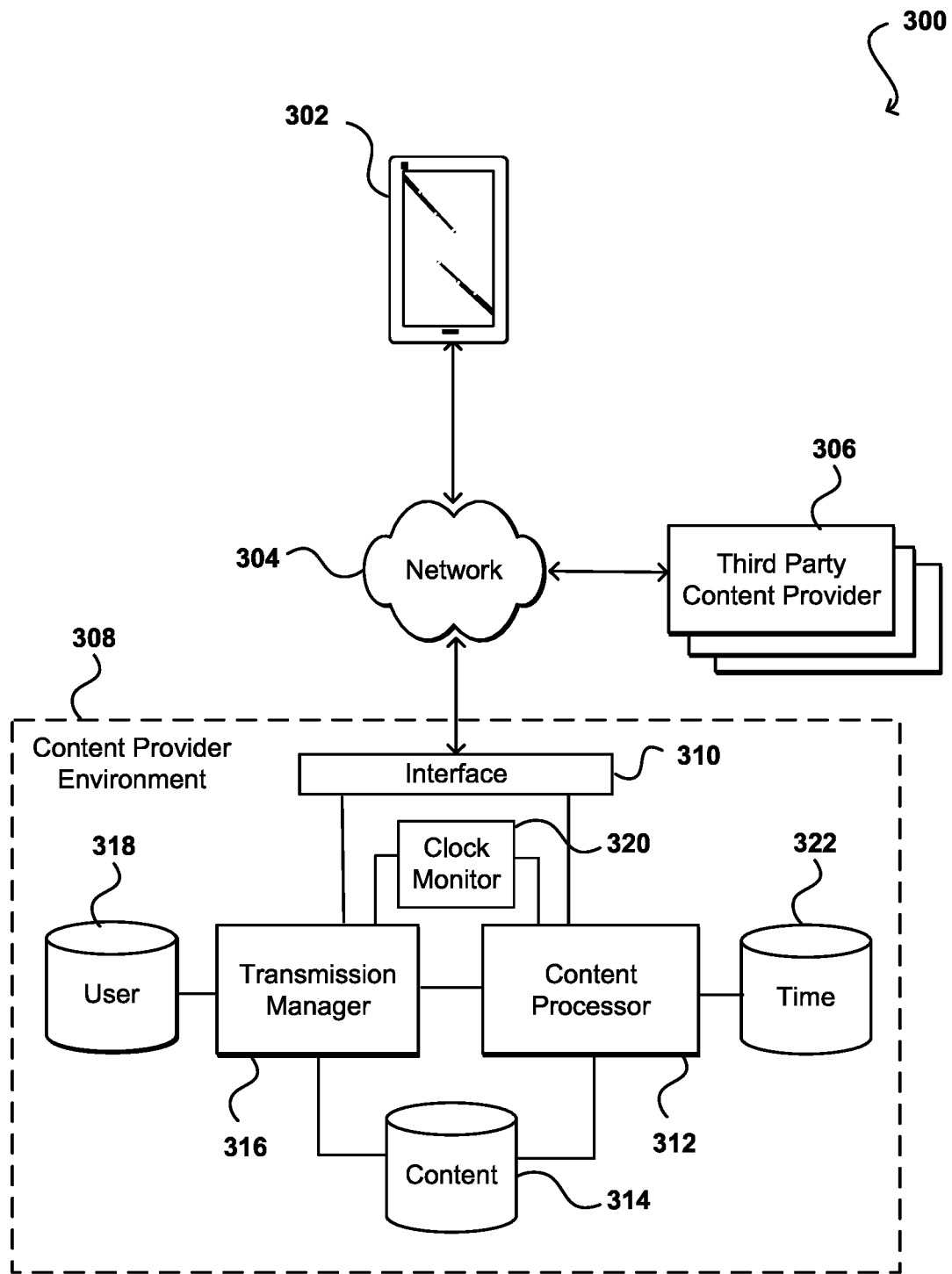
FIG. 3 illustrates an example real time processing system that can be utilized in accordance with various embodiments.

FIG. 3 illustrates an example environment 300 in which aspects of various embodiments can be implemented. In this example, a user may utilize a client device 302 to request or obtain content from a content provider environment 308. The client device may communicate with the content provider environment 308 over at least one network 304, such as the Internet or a cellular network. The content may include any appropriate content generated or obtained by one or more resources of the content provider environment, such as by obtaining content from a third party provider. In at least one embodiment, this third party content may include media content sent over one or more live data streams and received to an interface layer 310 of the resource provider environment. There may be other types of content or data utilized as well within the scope of the various embodiments.

In this example, the content can be directed to a content processor 312 to perform at least some type of processing on the content. For media content, this can include processing relating to transcoding, formatting, packaging, and other such tasks. The content processor 312 may include one or more applications or processes executing on one or more hardware resources (e.g., servers) in the content provider environment 308. The content, once processed, can be stored or cached to a content repository 314 in at least some embodiments, and delivered to a client device 302, as well as potentially other devices or recipients, using a transmission manager 316 or other such system, service, or process. In at least some embodiments, the transmission manager 316 may also be responsible for checking data in a user data repository 318, or user account, to determine whether the user has rights to the content that enable that content to be delivered, at least in a particular form, to the client device 302. Because the content to be delivered may include content received from a content source over a live stream that is to be delivered in real time, it can be desirable to ensure that systems or components such as the content processor 312 and transmission manager 316 operate in real time and do not fall too far behind, such that undesirable delays or drops in content may be experienced. In this example, one or both of these components can utilize at least one clock monitor 320 to obtain real time clock updates as discussed and suggested herein. The clock monitor may be on a same hardware device or resource as either or both of the content processor 312 and transmission manager 316, and may communicate with a clock that is internal or external to that same device or resource. In some embodiments, the clock monitor may be a service that communicates with an official clock in the content provider environment 308, and may communicate that time to any appropriate system, service, application, device, or process inside, or external to, the content provider environment 308. The clock monitor 320 can provide timing information that can be used to determine a potential source of time loss for one or more components or applications in the content provider environment, which can then make appropriate adjustments, if necessary, to account for the time loss. For example, the content processor 312 can compare a reported current time against an expected time, as may be stored to a time cache 322 or other such memory or storage, to determine whether time has been lost, and if so an extent of time that has been lost, to determine whether or not to take one or more actions as discussed elsewhere herein.

Figure 4:
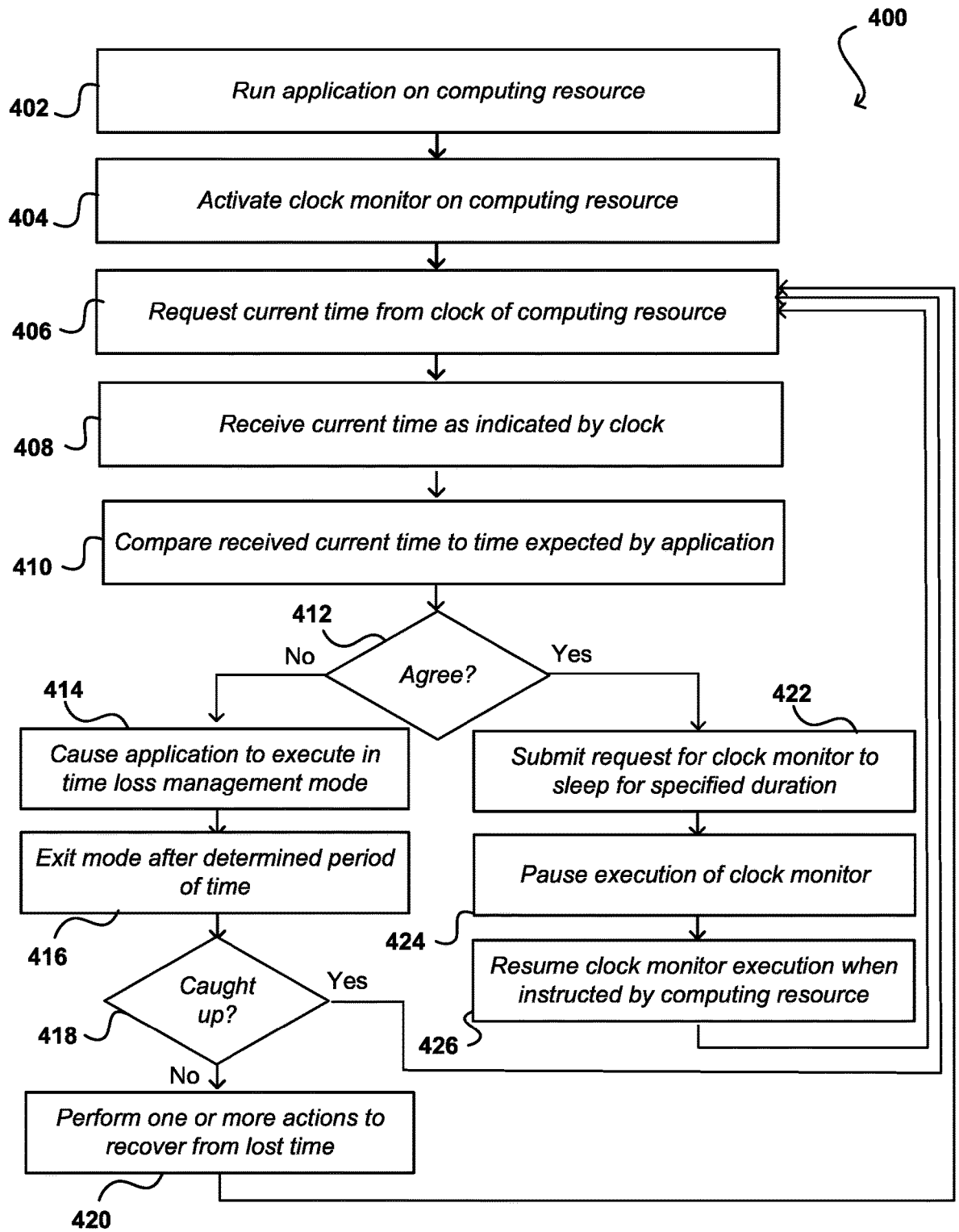
FIG. 4 illustrates an example process for determining and compensating for time loss that can be utilized in accordance with various embodiments.

FIG. 4 illustrates an example process 400 for determining, and compensating for, time loss that can be performed in accordance with various embodiments. It should be understood that for this and other processes presented herein that there can be additional, fewer, or alternative steps performed in similar or alternative orders, or at least partially in parallel, within the scope of the various embodiments unless otherwise specifically stated. Further, while this process may be described with respect to the specific example of content processing, it should be understood that various other time-sensitive systems, services, applications, or processes can benefit from use of such a process in accordance with various embodiments.

In this example, an application us run 402 on a computing resource, such as a personal computer or remote server. In some embodiments, this may include one of a number of virtual machines executing on that computing resource, which may be provisioned for various users, applications, or services. For at least this application, or at least this virtual machine, a clock monitor can be activated 404 on the computing resource. This clock monitor can include a thread or process that is associated with the application in at least some embodiments. The clock monitor can be used to request 406 a current time value from a clock of the computing resource, such as a system clock or CPU clock, among other such options. In at least some embodiments, the clock monitor can be configured to periodically request the current time value at a specified interval. In response to the request, the current time value can be received 408 as indicated by the clock. This time value can be received by the clock monitor in some embodiments, then pushed to, or requested by, the application. In some embodiments the application may ask a time-related question, such as whether the clock monitor detected a loss of time, at least greater than a variation threshold, within a recent period of time, among other such options. The application (or clock monitor) can then compare 410 the received current time value to the time value expected by the application (or other requestor). If it is determined 412 that the reported current time and expected time values agree, at least within a matching threshold, criterion, or range allowing for some slight amount of normal jitter or variation, then in this example a request can be submitted 422 for the clock monitor (e.g., thread or process) to be put to sleep, or paused, for a specified duration of time. As mentioned, this request may be sent to an OS on a computing resource, for example, that can pause the thread or process and then resume the thread or process after the specified period of time. As mentioned, this resume action can be given a high priority in at least some embodiments to prevent a scheduling delay in the resumption. The execution of the clock monitor can then be paused 424, or otherwise prevented from executing for a period of time, and execution of the clock monitor can resume 426 when instructed (or otherwise enabled) by the computing resource (or other pausing mechanism). The clock monitor can then proceed as normal to make another request for the current time and continue the monitoring process.

If, however, it is determined that the reported current time and expected time values do not agree, at least within a specified amount of variance or jitter, then in this example, the application can be caused 414 to execute in a time loss management mode, such as a relaxed mode of operation. As mentioned, there may be other loss management modes utilized as well within the scope of the various embodiments, such as a hyper or overdrive mode where additional resources or capacity are used to attempt to recover from the loss, such as to allow portions of the work to be spread or distributed across additional compute resources for at least the duration of mode operation. In at least some embodiments, an application will cause itself to operate in a relaxed mode, at least when the loss of time is less than a maximum acceptable loss threshold. In a relaxed mode, the application will delay activating recovery mechanisms for at least a period of time, in order to allow the application sufficient time to recover from the detected time loss without taking more aggressive action. In at least some embodiments, an application may be able to process content faster than it is received, such that the application may be able to recover from short periods of time loss without additional action. In this example, the application will execute in a relaxed mode for a determined length of time, such as on the order of 5 seconds or 10 seconds, after which time the application will be caused to exit 416 the relaxed mode or resume a normal mode of operation. Upon (or around the time of) exiting relaxed mode, another determination can be made 418 as to whether the application was able to catch up or recover from the time loss during that period of relaxed mode operation. If the application was able to recover then the clock monitor can continue to request the current time and the application can continue operating as normal. If, however, it is determined that the application was not able to catch up or recover during the period of relaxed mode operation, then one or more recovery actions can be performed 420 to attempt to recover from the time loss. These more aggressive recovery actions can include, for example, dropping or discarding data, processing only a portion of the data, accelerating a processing or receiving of data, or another such action. If such an action enables the application to recover, albeit with less than optimal output, then the process can continue as normal. If, however, the application is still not able to recover, then a more drastic action can be taken, such as to move the workload to another server, restart the application or server, notify a network operator, or remove a resource from service, among other such options. In at least some of these examples, an attempt can be made to avoid a loss of user data, or minimize such loss, while processing and providing as much of that data, with as minimal delay, as possible.

Such a process can be utilized in any system, service, application or process that has some amount of steady state work to do per unit time, as well as one or more mechanisms for doing a lower quality job of that work, such as to drop work or modify processing of that work, when it detects that it is falling behind real time. As mentioned, in a video-based application recovery mechanisms can include actions such as dropping video frames, which results in a lower rate of frames per second (fps) or increasing a speed of an input component, which then may be unable to use its full range of motion search and range of encoding modes, or other such functionality. There may be other domain- or application-specific shortcuts that can be taken to catch up or recover for other embodiments as well, such as to only process a portion of each frame. In some embodiments, an application may be able to switch to a backup system or component if available to take over the processing. A switch to different hardware may be warranted if one or more delays are due to external causes such as issued with I/O or interrupts, for example.

In some embodiments, the frequency of time requests can be configurable by a user, application, or other such source or authority. The frequency may be selected based upon factors such as the trustworthiness or reliability of a system, as well as the sensitivity of an application to clock loss. The frequency can be above the noise threshold, as discussed previously, and can be based at least in part upon the frequency of operations to be performed. For example, in an application that processes sixty frames per second, a frame is to be processed about every 16 ms. Customers may care about receiving each individual frame, as well as the latency with which those frames are received. The frequency of time requests may then be set to occur at least as often as the receiving of each video frame, or at least as much buffering as utilized. While it may be desirable to limit an amount of buffering to conserve resources, if an application is willing to buffer one second of video data then the clock check frequency could be set on the order of around one second. The frequency might also be set based on how long an application is likely to be paused by an outside source, such as where a typical operating system pause for a patch or update might be on the order of around 1.5 seconds. Setting the frequency too high can consume more resources than needed, while setting the frequency too low may result in missed or delayed time loss determinations. While increased buffering may help address some of these issues, at least some applications are expected to send output at a determined frequency, and while paused the application will not be sending any of this output, such as UDP packets with video payload. This can result in a receiver getting confused as to the timing of these packets being sent. Thus, in an example video application the clock check frequency is set to once every 50 ms, with a tolerance of up to 200 ms before determining that the layer below the application likely lost some time.

Figure 5:
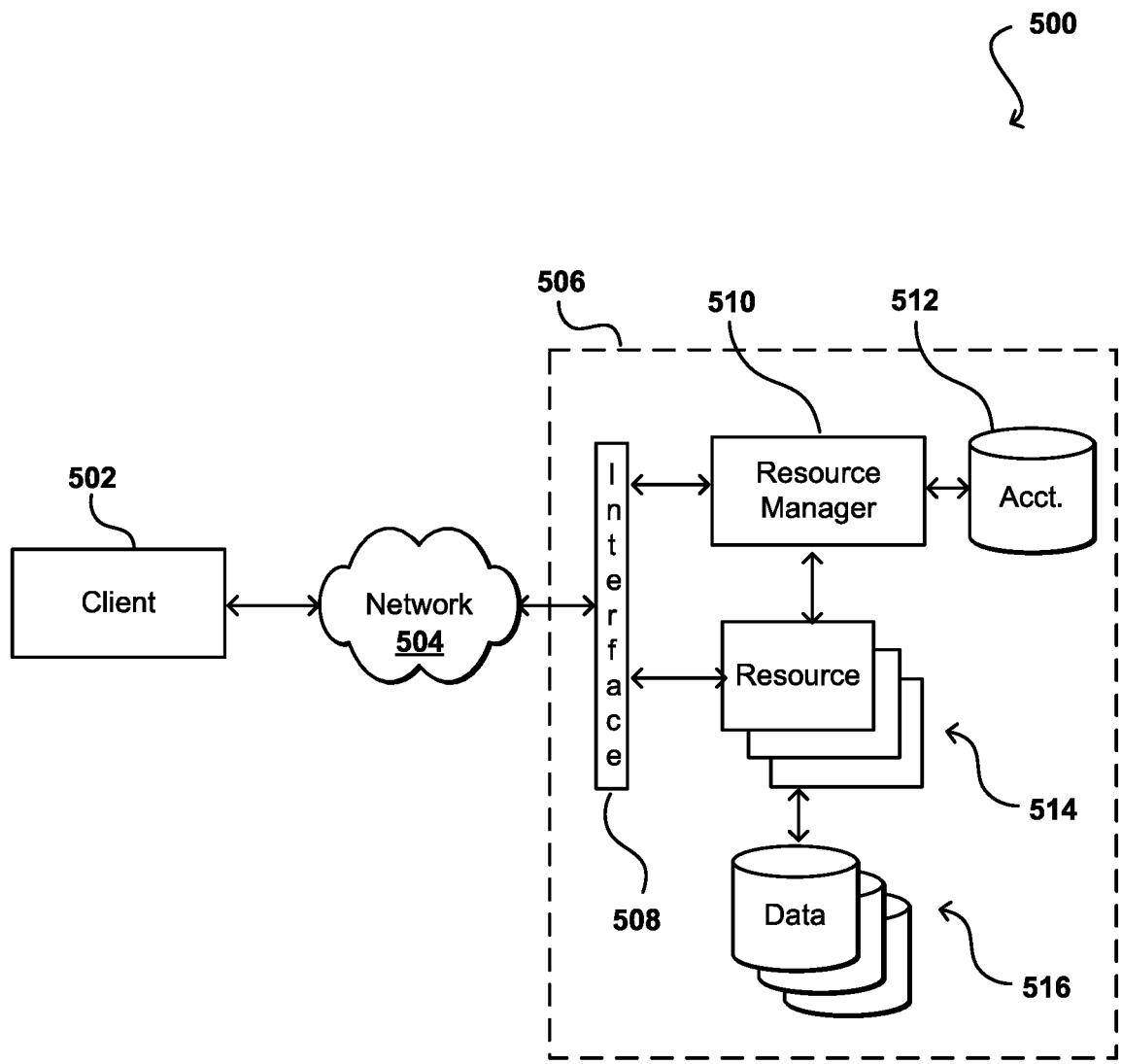
FIG. 5 illustrates an example resource environment in which aspects of various embodiments can be implemented.

FIG. 5 illustrates an example environment 500 in which aspect of various embodiments can be implemented. Such an environment can be used in some embodiments to provide resource capacity for one or more users, or customers of a resource provider, as part of a shared or multi-tenant resource environment. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 506 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
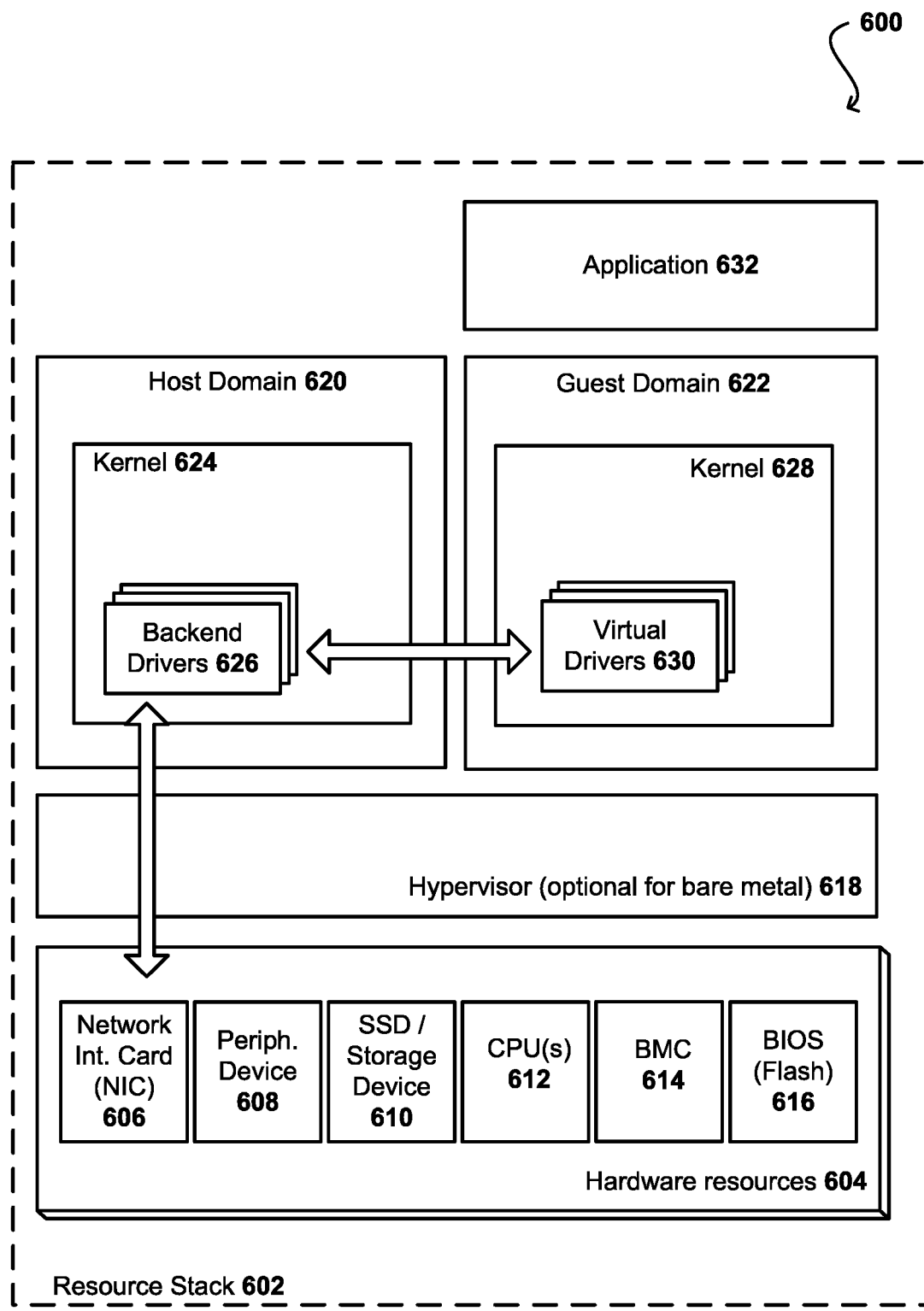
FIG. 6 illustrates components of a virtualized environment in which aspects of various embodiments can be implemented.

FIG. 6 illustrates an example resource stack 602 of a physical resource 600 that can be utilized in accordance with various embodiments. Such a resource stack 602 can be used to provide an allocated environment for a user (or customer of a resource provider) having an operating system provisioned on the resource. In accordance with the illustrated embodiment, the resource stack 602 includes a number of hardware resources 604, such as one or more central processing units (CPUs) 612; solid state drives (SSDs) or other storage devices 610; a network interface card (NIC) 606, one or more peripheral devices (e.g., a graphics processing unit (GPU), etc.) 608, a BIOS implemented in flash memory 616, and a baseboard management controller (BMC) 614, and the like. In some embodiments, the hardware resources 604 reside on a single computing device (e.g. chassis). In other embodiments, the hardware resources can reside on multiple devices, racks, chassis, and the like. Running on top of the hardware resources 604, a virtual resource stack may include a virtualization layer such as a hypervisor 618 for a Xen-based implementation, a host domain 620, and potentially also one or more guest domains 622 capable of executing at least one application 632. The hypervisor 618, if utilized for a virtualized environment, can manage execution of the one or more guest operating systems and allow multiple instances of different operating systems to share the underlying hardware resources 604. Conventionally, hypervisors are installed on server hardware, with the function of running guest operating systems, where the guest operating systems themselves act as servers.

In accordance with an embodiment, a hypervisor 618 can host a number of domains (e.g., virtual machines), such as the host domain 620 and one or more guest domains 622. In one embodiment, the host domain 620 (e.g., the Dom-0) is the first domain created and helps virtualize hardware resources and manage all of the other domains running on the hypervisor 618. For example, the host domain 620 can manage the creating, destroying, migrating, saving, or restoring the one or more guest domains 622 (e.g., the Dom-U). In accordance with various embodiments, the hypervisor 618 can control access to the hardware resources such as the CPU, input/output (I/O) memory, and hypervisor memory.

A guest domain 622 can include one or more virtualized or para-virtualized drivers 630 and the host domain can include one or more backend device drivers 626. When the operating system (OS) kernel 628 in the guest domain 622 wants to invoke an I/O operation, the virtualized driver 630 may perform the operation by way of communicating with the backend device driver 626 in the host domain 620. When the guest driver 630 wants to initiate an I/O operation (e.g., to send out a network packet), a guest kernel component can identify which physical memory buffer contains the packet (or other data) and the guest driver 630 can either copy the memory buffer to a temporary storage location in the kernel for performing I/O or obtain a set of pointers to the memory pages that contain the packet(s). In at least one embodiment, these locations or pointers are provided to the backend driver 626 of the host kernel 624 which can obtain access to the data and communicate it directly to the hardware device, such as the NIC 606 for sending the packet over the network.

It should be noted that the resource stack 602 illustrated in FIG. 6 is only one possible example of a set of resources that is capable of providing a virtualized computing environment and that the various embodiments described herein are not necessarily limited to this particular resource stack. In some embodiments, the guest domain 622 may have substantially native or "bare metal" access to the NIC 606 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 614 can maintain a list of events that have occurred in the system, referred to herein as a system event log (SEL). In at least one embodiment, the BMC 614 can receive system event logs from the BIOS 616 on the host processor. The BIOS 616 can provide data for system events over an appropriate interface, such as an $I^2C$ interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 618 can prevent the guest operating system, or guest domain 622, from sending such system event log data to the BMC 614. In the case of bare metal access without such a hypervisor, however, user instances can have the ability to send data for system event that spoof events from the BIOS 616. Such activity could lead to compromised bare metal instances being prematurely degraded due to fake system event data produced by the user OS.

In at least one embodiment, however, there will be portions of the physical resource 600 that will be inaccessible to the user OS. This can include, for example, at least a portion of BIOS memory 616. BIOS memory 616 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 616 at boot time, before a user OS is executing on the resource. Once the user OS is executing on the resource, that OS will be prevented from accessing that secret token in BIOS memory 616. In at least one embodiment, this secret token (or other stored secret) can be provided to the BMC 614 when adding system event log events, whereby the BMC 614 can confirm that the event is being sent by the BIOS 616 and not by the user OS.

Figure 7:
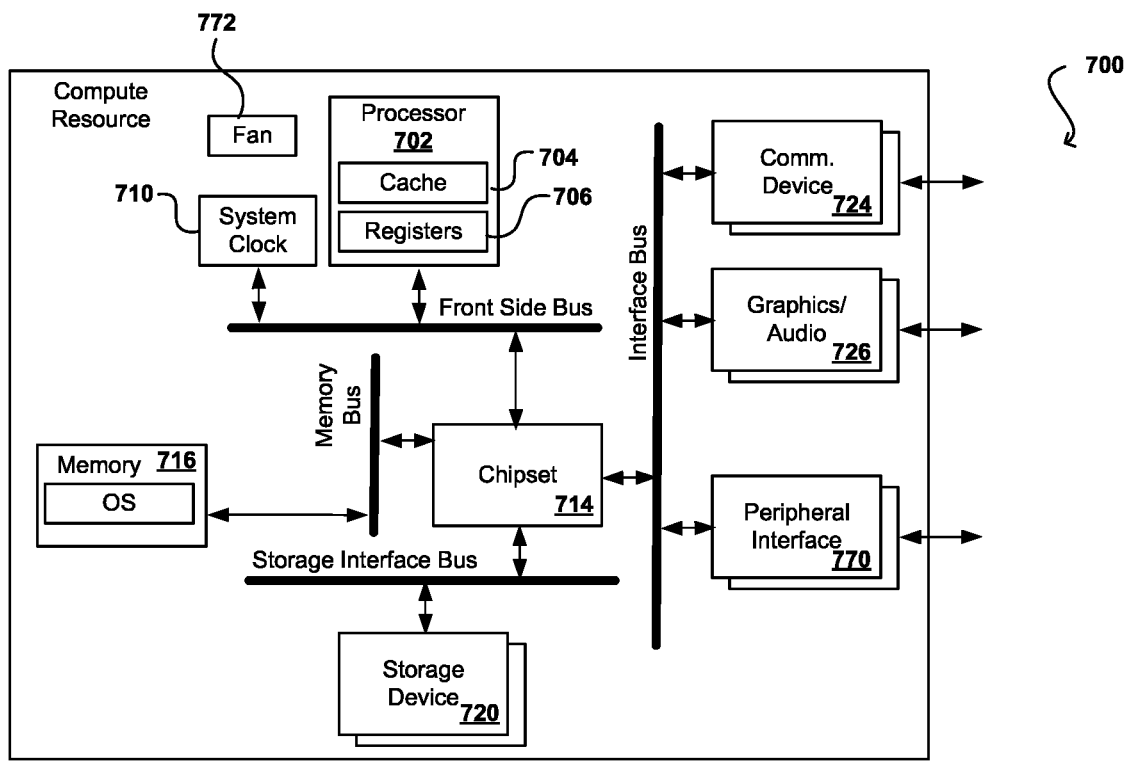
FIG. 7 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 7 illustrates components of an example computing resource 700 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 700 (e.g., a desktop or network server) will have one or more processors 702, such as central processing units (CPUs), graphics processing units (GPUs), and the like, that are electronically and/or communicatively coupled with various components using various buses, traces, and other such mechanisms. A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form or physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory. The processor 702 can also communicate with various other components via the chipset 714 and an interface bus (or graphics bus, etc.), where those components can include communications devices 724 such as cellular modems or network cards, media components 726, such as graphics cards and audio components, and peripheral interfaces 770 for connecting peripheral devices, such as printers, keyboards, and the like. At least one cooling fan 772 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 702 can obtain data from physical memory 716, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 704 in at least some embodiments. The computing device 700 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 770, a communication device 724, a graphics or audio card 726, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 702 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (MC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The lit) adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs" The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    executing, in a virtualized environment, a time-sensitive task;
    periodically requesting a current time value from a reference clock source;
    determining that the current time value differs from an expected time value; and
    causing an application executing the time-sensitive task to operate in an overdrive mode for period of time, wherein the overdrive mode uses additional resources or capacity to recover a difference in time between the current time value and the expected time value.

2. The computer-implemented method of claim 1, further comprising:
    periodically requesting a second current time value from the reference clock source;
    determining that the second current time value is within a threshold amount of the expected time value; and
    causing the application executing the time-sensitive task to exit the overdrive mode.

3. The computer-implemented method of claim 1, wherein actions of the overdrive mode include at least one of discarding a subset of data to be processed, processing only a portion of the data, or performing less processing of the data for the time-sensitive task.

4. The computer-implemented method of claim 1, further comprising:
    causing the application executing the time-sensitive task to operate in a relaxed mode of operation, wherein the overdrive mode is delayed; and
    after a specified period of time, causing the application executing the time-sensitive task to exit the relaxed mode of operation.

5. The computer-implemented method of claim 1, wherein the time-sensitive task is executed using instructions from an application executing on a processor of a computing device, and wherein the reference clock source operates independent of the application on the computing device.

6. The computer-implemented method of claim 1, further comprising:
    periodically requesting a second current time value from the reference clock source;
    determining that the second current time value exceeds a threshold amount of the expected time value; and
    causing the application executing the time-sensitive task to exit the overdrive mode and to enter an enhanced recovery mode of operation.

7. The computer-implemented method of claim 6, wherein actions of the enhanced recovery mode include at least one of moving a workload to another server, restarting the application, notifying a network operator, or removing a resource from service.

8. A system, comprising:
    at least one processor; and
    memory including instructions that, when executed by the at least one processor, cause the system to:
        execute, in a virtualized environment, a time-sensitive task;
        periodically request a current time value from a reference clock source;
        determine that the current time value differs from an expected time value; and
        cause an application executing the time-sensitive task to operate in an overdrive mode for period of time, wherein the overdrive mode uses additional resources or capacity to recover a difference in time between the current time value and the expected time value.

9. The system of claim 8, wherein the instructions when executed further cause the system to:
    periodically request a second current time value from the reference clock source;
    determine that the second current time value is within a threshold amount of the expected time value; and
    cause the application executing the time-sensitive task to exit the overdrive mode.

10. The system of claim 8, wherein actions of the overdrive mode include at least one of discarding a subset of data to be processed, processing only a portion of the data, or performing less processing of the data for the time-sensitive task.

11. The system of claim 8, wherein the instructions when executed further cause the system to:
    cause the application executing the time-sensitive task to operate in a relaxed mode of operation, wherein the overdrive mode is delayed; and
    after a specified period of time, cause the application executing the time-sensitive task to exit the relaxed mode of operation.

12. The system of claim 8, wherein the time-sensitive task is executed using instructions from an application executing on a processor of a computing device, and wherein the reference clock source operates independent of the application on the computing device.

13. The system of claim 8, wherein the instructions when executed further cause the system to:
    periodically request a second current time value from the reference clock source;
    determine that the second current time value exceeds a threshold amount of the expected time value; and
    cause the application executing the time-sensitive task to exit the overdrive mode and to enter an enhanced recovery mode of operation.

14. The system of claim 8, wherein actions of the enhanced recovery mode include at least one of moving a workload to another server, restarting the application, notifying a network operator, or removing a resource from service.

15. A non-transitory computer-readable media comprising a plurality of purchase order identifications and associated purchase orders and comprising instructions that, when executed by a processor of a computing system, causes the computing system to:
    execute, in a virtualized environment, a time-sensitive task;

periodically request a current time value from a reference clock source;

determine that the current time value differs from an expected time value; and cause an application executing the time-sensitive task to operate in an overdrive mode for period of time, wherein the overdrive mode uses additional resources or capacity to recover a difference in time between the current time value and the expected time value.

16. The non-transitory computer-readable media of claim 15, wherein the instructions that, when executed by the processor of the computing system, causes the computing system to:

periodically request a second current time value from the reference clock source;

determine that the second current time value is within a threshold amount of the expected time value; and cause the application executing the time-sensitive task to exit the overdrive mode.

17. The non-transitory computer-readable media of claim 15, wherein actions of the overdrive mode include at least one of discarding a subset of data to be processed, processing only a portion of the data, or performing less processing of the data for the time-sensitive task.

18. The non-transitory computer-readable media of claim 15, wherein the instructions that, when executed by the processor of the computing system, causes the computing system to:

cause the application executing the time-sensitive task to operate in a relaxed mode of operation, wherein the overdrive mode is delayed; and after a specified period of time, cause the application executing the time-sensitive task to exit the relaxed mode of operation.

19. The non-transitory computer-readable media of claim 15, wherein the time-sensitive task is executed using instructions from an application executing on a processor of a computing device, and wherein the reference clock source operates independent of the application on the computing device.

20. The non-transitory computer-readable media of claim 15, wherein the instructions that, when executed by the processor of the computing system, causes the computing system to:

periodically request a second current time value from the reference clock source;

determine that the second current time value exceeds a threshold amount of the expected time value; and cause the application executing the time-sensitive task to exit the overdrive mode and to enter an enhanced recovery mode of operation.

* * * * *